(12) United States Patent
Campbell et al.

(10) Patent No.: US 10,399,054 B2
(45) Date of Patent: Sep. 3, 2019

(54) NITROGEN-DOPED CARBON AEROGELS FOR ELECTRICAL ENERGY STORAGE

(71) Applicant: LAWRENCE LIVERMORE NATIONAL SECURITY, LLC, Livermore, CA (US)

(72) Inventors: Patrick Campbell, Oakland, CA (US); Elizabeth Montalvo, Oakland, CA (US); Theodore F. Baumann, Discovery Bay, CA (US); Juergen Biener, San Leandro, CA (US); Matthew Merrill, Dublin, CA (US); Eric W. Reed, Ancram, NY (US); Marcus A. Worsley, Hayward, CA (US)

(73) Assignee: Lawrence Livermore National Security, LLC, Livermore, CA (US)

( * ) Notice: Subject to any disclaimer, the term of this patent is extended or adjusted under 35 U.S.C. 154(b) by 0 days.

(21) Appl. No.: 15/648,290

(22) Filed: Jul. 12, 2017

(65) Prior Publication Data
US 2017/0304795 A1    Oct. 26, 2017

Related U.S. Application Data

(63) Continuation of application No. 14/820,397, filed on Aug. 6, 2015, now Pat. No. 9,776,156.

(51) Int. Cl.
| | |
|---|---|
| *B01J 13/00* | (2006.01) |
| *H01G 11/34* | (2013.01) |
| *H01G 11/24* | (2013.01) |
| *H01G 11/36* | (2013.01) |
| *C01B 32/00* | (2017.01) |

(52) U.S. Cl.
CPC .......... *B01J 13/0091* (2013.01); *C01B 32/00* (2017.08); *H01G 11/24* (2013.01); *H01G 11/34* (2013.01); *H01G 11/36* (2013.01); *Y02E 60/13* (2013.01); *Y02T 10/7022* (2013.01)

(58) Field of Classification Search
CPC .................................................. C04B 38/0022
USPC ........................................................ 264/28
See application file for complete search history.

(56) References Cited

U.S. PATENT DOCUMENTS

| | | | |
|---|---|---|---|
| 5,260,855 A * | 11/1993 | Kaschmitter | ....... C04B 38/0022 |
| | | | 264/28 |
| 7,074,880 B2 | 7/2006 | Rhine et al. | |

FOREIGN PATENT DOCUMENTS

| | | | | |
|---|---|---|---|---|
| CN | 103709346 A | | 4/2014 | |
| CN | 104446330 A | * | 3/2015 | ............. C01B 31/02 |
| EP | 2 687 483 A1 | | 1/2014 | |

(Continued)

OTHER PUBLICATIONS

Antonietti et al., "Carbon aerogels and monoliths: Control of porosity and nanoarchitecture via sol-gel routes", Chemistry of Materials, 2014, vol. 26, pp. 196-210.

(Continued)

*Primary Examiner* — Khanh T Ngyuen
(74) *Attorney, Agent, or Firm* — Foley & Lardner, LLP

(57) ABSTRACT

Disclosed here is a composition comprising a nitrogen-doped carbon aerogel, wherein the nitrogen-doped carbon aerogel comprises a polymerization product of formaldehyde and at least one nitrogen-containing resorcinol analog. Also disclosed is a supercapacitor comprising the nitrogen-doped carbon aerogel.

19 Claims, 3 Drawing Sheets

(56) References Cited

FOREIGN PATENT DOCUMENTS

WO     WO-2013/132388 A1     9/2013

OTHER PUBLICATIONS

Brun et al., "Carbohydrate-derived nanoarchitectures: on a synergistic effect toward an improved performance in lithium-sulfur batteries." ACS Sustainable Chemistry & Engineering, 2014, vol. 2, pp. 126-129.

Jin et al., "Electrochemical properties of carbon aerogels derived from resorcinol-formaldehyde-aniline for supercapacitors." Pigment and Resin Technology, 2011, vol. 40, No. 3, pp. 175-180.

Kang et al., "Enhanced electrochemical capacitance of nitrogen-doped carbon gels synthesized by microwave-assisted polymerization of resorcinol and formaldehyde", Electrochemistry Communications, 2008, vol. 10, pp. 1105-1108.

Kicinski et al., "Heteroatom-doped carbon gels from phenols and heterocyclic aldehydes: Sulfur-doped carbon xerogels", Carbon, 2014, vol. 75, pp. 56-67.

Li et al., "Nitric Acid Activated Carbon Aerogels for Supercapacitors." Applied Mechanics and Materials, 2013, vol. 302, pp. 158-164.

Liu et al., "Preparation and performance of nitrogen-doped carbon aerogels as electrode materials", High Power Laser and Particle Beams, Dec. 2012, vol. 24, No. 12, pp. 1-5, abstract.

Moreno-Castilla et al., "Electrochemical performance of carbon gels with variable surface chemistry and physics", Carbon, 2012, vol. 50, pp. 3324-3332.

Qin et al., "Activated nitrogen-enriched carbon/carbon aerogel nanocomposites for supercapacitor applications." Transactions of Nonferrous Metals Society of China, 2009, vol. 19, pp. S738-S742.

Qin et al., "Study of activated nitrogen-enriched carbon and nitrogen-enriched carbon/carbon aerogel composite as cathode materials for supercapacitors", Materials Chemistry and Physics, 2011, vol. 126, pp. 453-458.

Vesela et al., "Pyrolysis of N-doped organic aerogels with relation to sorption properties", J. Ther. Anal. Calorim., 2012, vol. 108, pp. 475-480.

Wang et al., "Novel preparation of nitrogen-doped graphene in various forms with aqueous ammonia under mild conditions." RSC Advances, 2013, vol. 2, No. 30, pp. 11249-11252.

Wei et al., "Design and synthesis of carbonized polypyrrole-coated graphene aerogel acting as an efficient metal-free catalyst for oxygen reduction." Rsc Advances, 2014, vol. 4, No. 33, pp. 16979-16984.

Yun et al., "Carbon aerogels based on regenerated silk proteins and graphene oxide for supercapacitors." Macromolecular Research, 2014, vol. 22, No. 5, pp. 509-514.

Zhao et al, "A Versatile, Ultralight, Nitrogen-Doped Graphene Framework." Angewandte Chemie-International Edition, 2012, vol. 51, No. 45, pp. 11371-11375.

Zhao et al., "Three-dimensional graphene-based hydrogel/aerogel materials." Reviews on Advanced Materials Science, 2014, vol. 36, No. 2, pp. 137-151.

Notice of Allowance in U.S. Appl. No. 14/820,397, dated Jun. 22, 2017.

Non-Final Office Action in U.S. Appl. No. 14/820,397, dated Mar. 23, 2017.

* cited by examiner

NITROGEN-DOPED CARBON AEROGELS FOR ELECTRICAL ENERGY STORAGE

CROSS REFERENCE TO RELATED APPLICATIONS

This application is a continuation of U.S. patent application Ser. No. 14/820,397 filed Aug. 6, 2015, which is hereby incorporated by reference in its entirety.

STATEMENT OF GOVERNMENT SUPPORT

This invention was made with government support under Contract No. DE-AC52-07NA27344 awarded by the U.S. Department of Energy. The government has certain rights in this invention.

BACKGROUND

Energy storage devices are becoming more important with the increasing generation of energy from renewable sources. Supercapacitors, also known as electrochemical double-layer capacitors, are devices that store electrical energy via polarization of an electrode/electrolyte interface. The operating mechanisms for supercapacitors include electric double-layer capacitance (EDLCs) and pseudocapacitance. Supercapacitors have a higher power density and a longer lifetime than batteries, but often suffer from a lower energy density.

Carbon aerogels have received considerable attention for energy related applications such as electrode materials for supercapacitors due to their unique combination of properties, including tunable morphology, high surface area, electrical conductivity, chemical inertness and environmental compatibility. Recent studies have shown that, through the incorporation of nitrogen into the hexagonal carbon lattice, nitrogen doping of some carbon nanomaterials can increase their energy density by increasing their specific capacitance. Currently, nitrogen-doped carbon nanomaterials are mainly produced in solid state by high temperature annealing in the presence of ammonia. Such method, however, suffers from high energy consumption and low nitrogen incorporation.

Thus, a need exists for the development of a more energy efficient method for synthesizing nitrogen-doped carbon aerogels with a higher and controllable nitrogen content.

SUMMARY

One aspect of some embodiments of the invention described herein relates to a method for making a nitrogen-doped carbon aerogel, comprising: preparing a reaction mixture comprising formaldehyde, at least one nitrogen-containing resorcinol analog, at least one catalyst, and at least one solvent; curing the reaction mixture to produce a wet gel; drying the wet gel to produce a dry gel; and thermally annealing the dry gel to produce the nitrogen-doped carbon aerogel.

Another aspect of some embodiments of the invention described herein relates to a composition comprising a nitrogen-doped carbon aerogel obtained according to the disclosed method.

A further aspect of some embodiments of the invention described herein relates to a supercapacitor comprising the nitrogen-doped carbon aerogel.

These and other features, together with the organization and manner of operation thereof, will become apparent from the following detailed description when taken in conjunction with the accompanying drawings.

DETAILED DESCRIPTION

Figure 1:
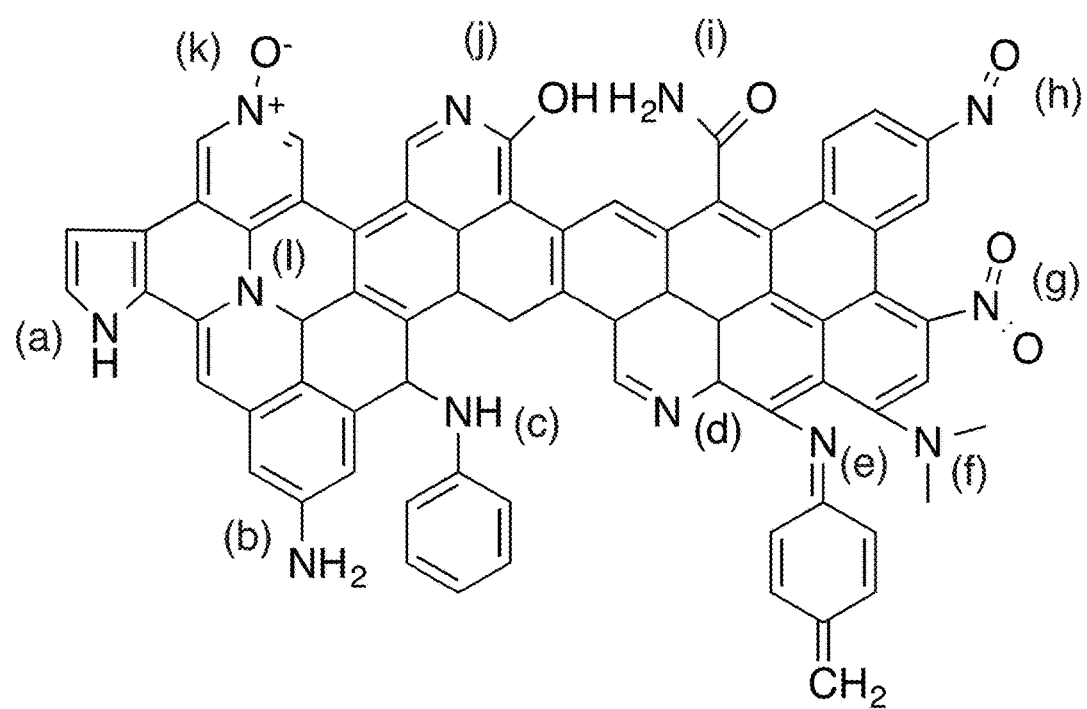
FIG. 1: Example nitrogen functionalities that can be incorporated into a carbon lattice: (a) pyrrole, (b) primary amine, (c) secondary amine, (d) pyridine, (e) imine, (f) tertiary amine, (g) nitro, (h) nitroso, (i) amide, (j) pyridine, (k) pyridine-N-oxide and (l) quaternary nitrogen.

Reference will now be made in detail to some specific embodiments of the invention contemplated by the inventors for carrying out the invention. Certain examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims.

In the following description, numerous specific details are set forth in order to provide a thorough understanding of the present invention. Particular example embodiments of the present invention may be implemented without some or all of these specific details. In other instances, well known process operations have not been described in detail in order not to unnecessarily obscure the present invention.

Various techniques and mechanisms of the present invention will sometimes be described in singular form for clarity. However, it should be noted that some embodiments include multiple iterations of a technique or multiple instantiations of a mechanism unless noted otherwise.

Methods for Making Nitrogen-Doped Carbon Aerogels

Nitrogen-doped carbon aerogels can be synthesized by a polymer approach similar to the synthesis of carbon aerogels, albeit using at least one resorcinol analog (e.g., pyridinediol and aminophenol) as the nitrogen-containing precursor. Using this approach, the amount of nitrogen in the material can be controlled by synthesizing polymer gels containing different ratios of the resorcinol analog (e.g., pyridinediol and aminophenol), varying the pyrolysis temperature, and/or or changing the solvent and catalyst used in the synthesis.

Many embodiments of the invention described herein relates to a method for making a nitrogen-doped carbon aerogel, comprising: preparing a reaction mixture comprising formaldehyde, at least one nitrogen-containing resorcinol analog, at least one catalyst, and at least one solvent; curing the reaction mixture to produce a wet gel; drying the wet gel to produce a dry gel; and thermally annealing the dry gel to produce the nitrogen-doped carbon aerogel. Although the use of formaldehyde is preferred, the present invention also encompasses the use of another aldehyde or another carbonyl-containing compound in place of, or in combination with, formaldehyde.

The nitrogen-containing resorcinol analog includes nitrogen-containing compounds that are structurally similar to resorcinol and capable of polymerizing with formaldehyde in a sol-gel reaction. In some embodiments, the nitrogen-containing resorcinol analog comprises an aromatic ring linked to at least one hydroxyl group and optionally at least one amine, amide, nitro, nitroso, or imine group, wherein said aromatic ring optionally comprises at least one nitrogen atom in the ring. Said aromatic ring can be, for example, a five- or six-membered ring selected from the group consisting of benzene, pyridine, pyrazine, pyrimidine, pyridazine, pyrrole, pyrazole and imidazole. In some embodiments, the nitrogen-containing resorcinol analog does not comprise a triazine ring.

In some embodiments, the nitrogen-containing resorcinol analog comprises a nitrogen-containing ring linked to at least two hydroxyl groups, wherein the nitrogen-containing ring is selected from the group consisting of pyridine, pyrazine, pyrimidine, pyridazine, pyrrole, pyrazole and imidazole, wherein the nitrogen-containing ring can be optionally further derivatized.

In some embodiments, the nitrogen-containing resorcinol analog comprises a benzene ring or a nitrogen-containing ring linked to at least one hydroxyl group and at least one amine group, wherein the nitrogen-containing ring is selected from the group consisting of pyridine, pyrazine, pyrimidine, pyridazine, pyrrole, pyrazole and imidazole, wherein the benzene ring or the nitrogen-containing ring can be optionally further derivatized.

In some embodiments, the nitrogen-containing resorcinol analog is pyridinediol, such as 2,3-pyridinediol, 2,4-pyridinediol, 2,5-pyridinediol, 3,4-pyridinediol, and 3,5-pyridinediol. In some embodiments, the nitrogen-containing resorcinol analog is aminophenol, such as 2-aminophenol, 3-aminophenol, and 4-aminophenol.

The reaction mixture comprises at least one solvent. In some embodiments, the solvent is water. In some embodiments, the solvent is an organic solvent. In some embodiments, the reaction mixture comprises water and at least one organic solvent. In some embodiments, the reaction mixture comprises dimethylformamide. Other suitable organic solvents include, but are not limited to, for example, alcohol, tetrahydrofuran, ethylene glycol, N-methylpyrrolidone. DMSO, carbonates, acetone, etc.

The reaction mixture comprises at least one catalyst. In some embodiments, the catalyst is an acid catalyst. In some embodiments, the catalyst is a base catalyst. In some embodiments, the catalyst is acetic acid. Other suitable catalysts include, but are not limited to, for example, nitric acid, ascorbic acid, hydrochloric acid, sulfuric acid, sodium carbonate, sodium hydroxide, ammonium hydroxide and calcium sulfate.

In some embodiments, in the reaction mixture the molar ratio of the nitrogen-containing resorcinol analog to the catalyst ranges from about 1:1 to about 5000:1, or from about 5:1 to about 2000:1, or from about 10:1 to about 1000:1, or from about 20:1 to about 500:1, or from about 50:1 to about 200:1.

In some embodiments, in the reaction mixture the molar ratio of the nitrogen-containing resorcinol analog to the formaldehyde ranges from about 2:1 to about 1:10, or from about 1:1 to about 1:5, or at about 1:2.

In some embodiments, the reaction mixture consists essentially of or consists of formaldehyde, the at least one nitrogen-containing resorcinol analog, the at least one catalyst, and the at least one solvent.

In some embodiments, the reaction mixture is substantially or totally free of melamine or melamine derivatives.

In some embodiments, the reaction mixture is cured at a temperature of about 25° C. to about 100° C. to produce a wet gel. In some embodiments, the reaction mixture is cured at a temperature of about 85° C. The curing time can be, for example, about 4-168 hours, or about 8-120 hours, or about 12-72 hours. In some embodiments, the reaction mixture is cured at atmospheric pressure.

In some embodiments, the wet gel is subjected to solvent exchange to remove reaction by-products. Suitable solvents include, but are not limited to, water and acetone.

In some embodiments, the wet gel is dried under supercritical condition (e.g., using supercritical $CO_2$). In some embodiments, the wet gel is dried under ambient temperature and pressure. In some embodiments, the wet gel is freeze dried.

In some embodiments, the dry gel is pyrolyzed in an inert gas to produce a graphene aerogel. Suitable inert gases include, but are not limited to, for example, $N_2$ and noble gas. The drying temperature can be, for example, at least about 500° C., or at least about 600° C., or at least about 800° C., or at least about 1000° C., or from about 500° C. to about 1500° C., or from about 600° C. to about 1200° C., or at about 1050° C.

In some embodiments, the method comprises further functionalizing the nitrogen-doped carbon aerogel with additional nitrogen-containing functionalities.

In one specific embodiment, formaldehyde was added as 37% aqueous solution in a molar ratio of 1:2, nitrogen-containing precursor to formaldehyde. Acetic acid was used as a catalyst for the polymerization reaction and was added in a molar ratio of 50:1, nitrogen-containing precursor to acetic acid. Gel formulations were made with a nitrogen-containing precursor concentration of 0.9 M in dimethylformamide (DMF). The reaction mixture was then placed in a mold and cured at 85° C. for 3 d. The resulting gels were then washed in water (3×) and then in acetone (3×) before supercritically drying with $CO_2$. The resulting nitrogen-containing polymer foams were pyrolyzed at temperatures ranging from 600° C. to 1200° C. to generate nitrogen-doped carbon aerogels.

Nitrogen-Doped Carbon Aerogels

Many embodiments of the invention relates to a composition comprising a nitrogen-doped carbon aerogel obtained according to the method described herein. Electrochemical testing of these materials by cyclic voltammetry showed that these nitrogen-doped carbon aerogels can have a higher electrical energy storage capacity than undoped carbon aerogels. Accordingly, these nitrogen-doped carbon aerogels can be used in supercapacitor electrodes.

In some embodiments, the nitrogen-doped carbon aerogel has a nitrogen content of about 1 wt. % or more, or about 2 wt. % or more, or about 3 wt. % or more, or about 4 wt. % or more, or about 5 wt. % or more, or about 6 wt. % or more, or about 7 wt. % or more, or about 8 wt. % or more, or about 9 wt. % or more, or up to about 10%.

In some embodiments, the nitrogen-doped carbon aerogel has a surface area of about 100 $m^2$/g or more, or about 200 $m^2$/g or more, or about 300 $m^2$/g or more, or about 400 $m^2$/g or more, or about 500 $m^2$/g or more.

In some embodiments, the nitrogen-doped carbon aerogel has a density of about 0.5 g/ml or less, or about 0.4 g/ml or less, or about 0.3 g/ml or less, or about 0.2 g/ml or less, or about 0.1 g/ml or less.

In some embodiments, the nitrogen-doped carbon aerogel has a specific capacitance of about 50 F/g or more, or about 60 F/g or more, or about 70 F/g or more, or about 80 F/g or more, or about 90 F/g or more, or about 100 F/g or more.

In some embodiments, the nitrogen-doped carbon aerogel has an areal capacitance of about 15 $\mu$F/cm$^2$ or more, or about 20 $\mu$F/cm$^2$ or more, or about 25 $\mu$F/cm$^2$ or more, or about 30 $\mu$F/cm$^2$ or more.

In some embodiments, the nitrogen-doped carbon aerogel is in the form of a monolith having at least one lateral dimension of 100 microns or more, or 1 mm or more, or 10 mm or more, or 100 mm or more, or 1 cm or more.

In some embodiments, the nitrogen-doped carbon aerogel comprises, consists essentially of, or consists of the polymerization product of formaldehyde and the at least one nitrogen-containing resorcinol analog. In some embodiments, said polymerization product does not comprise any triazine rings.

Additional embodiments of the invention relates to a device comprising the nitrogen-doped carbon aerogel described herein. In some embodiments, the device is a supercapacitor.

Applications

The nitrogen-doped carbon aerogel described herein can be used in a variety of applications. For example, they can be used in electrical energy storage, supercapacitors and battery electrodes, hybrid capacitors, pseudocapacitors, ultracapacitors, microbatteries, Li-ion batteries, next-generation batteries, hybrid and electrical vehicles, small portable devices, cordless tools, airplane emergency doors, and renewable energy applications.

WORKING EXAMPLES

Example 1

Material Synthesis.

Three commercially available resorcinol analogues were investigated, pyridinediol, aminophenol, and 3,5-dihydroxyanaline. The standard resorcinol reaction was run in parallel to all tests for comparison. The 3,5-dihydroxyanaline proved to be brittle after pyrolysis and was therefore dropped from the investigation. Besides pyridinediol and aminophenol, other nitrogen-containing resorcinol analogs can also be used for making the N-doped carbon aerogel.

Resorcinol and 3-aminophenol were purchased from Sigma Aldrich. 3,5-pyridinediol was purchased from Parkway Scientific. Gel formulations were made with a substrate concentration of 0.9 M in dimethylformamide (DMF). Formaldehyde was added as 37% aqueous solution in a substrate-to-formaldehyde molar ratio of 1:2. Acetic acid was used as a catalyst for the polymerization reaction and was added in a substrate-to-acetic acid ratio of 50:1. The reaction mixture was then placed in a mold to control material shape, namely in a glass vial to form a monolith or in a thin glass mold to form a disk. The resulting gels were washed three times for twelve hours in water and then another three times for twelve hours in acetone. The gels were supercritically dried in CO$_2$. Finally, the gels were pyrolyzed at 1050° C.

The materials used in this study were 12% solids by mass in solution. The ratio of [reactant monomer]/[catalyst] (R/C) can affect density, surface area, and mechanical properties.

Characterization.

The as-synthesized gels were characterized by a variety of methods. Scanning Electron Microscopy (SEM) was used to visually examine the morphology of the resulting gels along with EDX to qualitatively assess atomic composition. The BET surface area was determined. Cyclic voltammetry was used to measure the electrochemical properties. X-ray photoelectron spectroscopy (XPS) was used to quantitatively determine nitrogen content as well as the type of nitrogen species incorporated into the materials (see FIG. 1 for examples of nitrogen species that can be incorporated into nitrogen-doped carbon aerogels).

Results.

Figure 2:
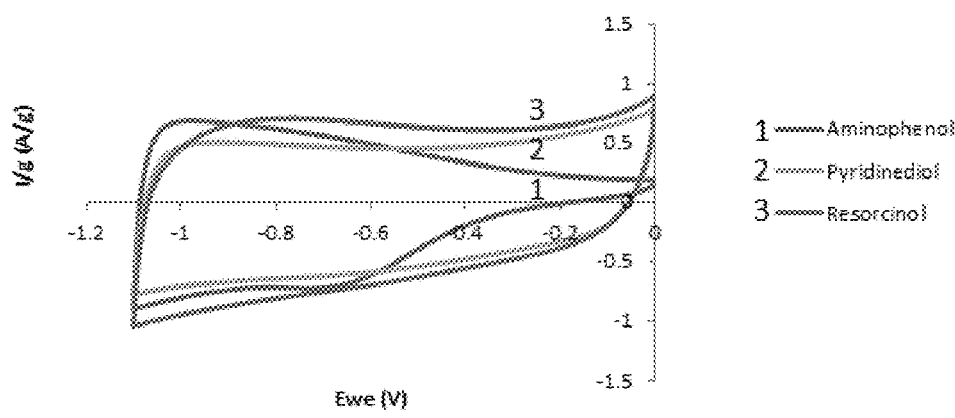
FIG. 2: Cyclic voltammograms for the aminophenol, pyridinediol, and resorcinol gels in 1M KOH with a scan rate of 6 mV/sec. When normalized by surface area, the N-doped samples demonstrate higher capacitance due to enhanced quantum capacitance and/or pseudocapacitive contributions.
Figure 2:
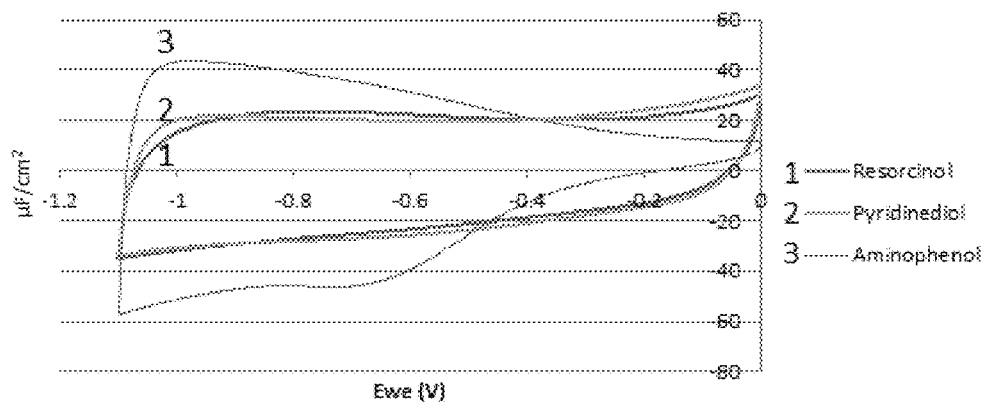

The properties of N-doped carbon aerogels produced from pyridinediol, aminophenol, and resorcinol are summarized in Table 1. The specific capacitance of N-containing materials is lower than the resorcinol control sample. However, when the capacitance is normalized by surface area, the capacitance of the N-containing materials is larger than that of the control sample due to quantum capacitance (changes to the electronic structure of the carbon lattice) and/or pseudocapacitive (fast redox/donor-acceptor) contributions (see FIG. 2).

TABLE 1

Summary of properties of materials produced from pyridinediol, aminophenol, and resorcinol.

| Starting Material | Density (g/mL) | Suface Area (m$^2$/g) | Specific Capacitance (F/g) | Areal Capacitance ($\mu$F/cm$^2$) |
|---|---|---|---|---|
| Pyridinediol | 0.185 | 383 | 90 | 23.5 |
| Aminophenol | 0.297 | 261 | 78 | 29.4 |
| Resorcinol | 0.329 | 497 | 114 | 22.9 |

Figure 3:
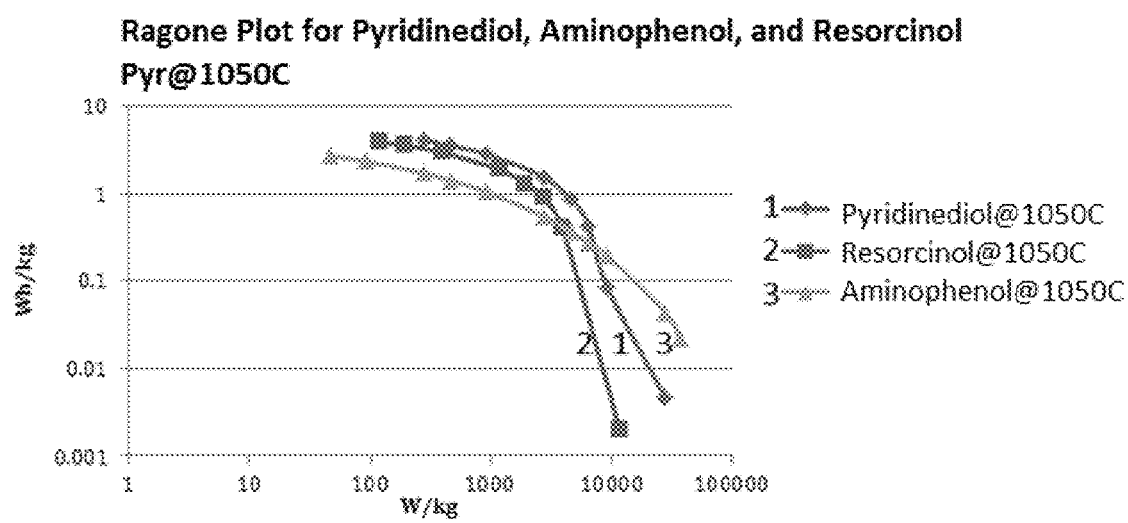
FIG. 3: Ragone plot (gravimetric) shows better performance (higher power and energy) for N-doped (pyridinediol derived) samples compared with resorcinol control sample, despite lower specific capacitance.

Two electrode cells were assembled to mimic a real-world charge-storage device. The Ragone plots in FIG. 3 illustrate that the pyridinediol-derived material has superior specific energy and power than the resorcinol control sample despite its lower specific capacitance.

As used herein, the singular terms "a," "an," and "the" include plural referents unless the context clearly dictates otherwise. Thus, for example, reference to a compound can include multiple compounds unless the context clearly dictates otherwise.

As used herein, the terms "substantially," "substantial," and "about" are used to describe and account for small variations. When used in conjunction with an event or circumstance, the terms can refer to instances in which the event or circumstance occurs precisely as well as instances in which the event or circumstance occurs to a close approximation. For example, the terms can refer to less than or equal to ±10%, such as less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%.

Additionally, amounts, ratios, and other numerical values are sometimes presented herein in a range format. It is to be understood that such range format is used for convenience and brevity and should be understood flexibly to include numerical values explicitly specified as limits of a range, but also to include all individual numerical values or sub-ranges encompassed within that range as if each numerical value and sub-range is explicitly specified. For example, a ratio in the range of about 1 to about 200 should be understood to include the explicitly recited limits of about 1 and about 200, but also to include individual ratios such as about 2, about 3, and about 4, and sub-ranges such as about 10 to about 50, about 20 to about 100, and so forth.

In the foregoing description, it will be readily apparent to one skilled in the art that varying substitutions and modifications may be made to the invention disclosed herein without departing from the scope and spirit of the invention. The invention illustratively described herein suitably may be practiced in the absence of any element or elements, limitation or limitations, which is not specifically disclosed herein. The terms and expressions which have been employed are used as terms of description and not of limitation, and there is no intention that in the use of such terms and expressions of excluding any equivalents of the features shown and described or portions thereof, but it is recognized that various modifications are possible within the scope of the invention. Thus, it should be understood that although the present invention has been illustrated by specific embodiments and optional features, modification and/or variation of the concepts herein disclosed may be resorted to by those skilled in the art, and that such modifications and variations are considered to be within the scopes of this invention.

What is claimed is:

1. A composition comprising a nitrogen-doped carbon aerogel, wherein the nitrogen-doped carbon aerogel consists essentially of polymerization product of formaldehyde and at least one nitrogen-containing resorcinol analog.

2. The composition of claim 1, wherein the resorcinol analog is selected from (a) an aromatic compound comprising a nitrogen-containing ring linked to at least two hydroxyl groups and (b) an aromatic compound comprising a benzene ring or nitrogen-containing ring linked to at least one hydroxyl group and at least one amine group, wherein the nitrogen-containing ring is selected from the group consisting of pyridine, pyrazine, pyrimidine, pyridazine, pyrrole, pyrazole and imidazole.

3. The composition of claim 1, wherein the resorcinol analog comprises pyridinediol.

4. The composition of claim 3, wherein the pyridinediol comprises 2,3-pyridinediol, 2,4-pyridinediol, 2,5-pyridinediol, 3,4-pyridinediol, and/or 3,5-pyridinediol.

5. The composition of claim 1, wherein the resorcinol analog comprises aminophenol.

6. The composition of claim 5, wherein the aminophenol comprises 2-aminophenol, 3-aminophenol, and/or 4-aminophenol.

7. The composition of claim 1, wherein the nitrogen-doped carbon aerogel consists of the polymerization product of formaldehyde and the at least one nitrogen-containing resorcinol analog.

8. The composition of claim 1, wherein the nitrogen-doped carbon aerogel has a nitrogen content of about 4 wt. % or more.

9. The composition of claim 1, wherein the nitrogen-doped carbon aerogel has a nitrogen content of about 8 wt. % or more.

10. The composition of claim 1, wherein the nitrogen-doped carbon aerogel has a surface area of about 100 $m^2/g$ or more.

11. The composition of claim 1, wherein the nitrogen-doped carbon aerogel has a surface area of about 300 $m^2/g$ or more.

12. The composition of claim 1, wherein the nitrogen-doped carbon aerogel has a density of about 0.5 g/ml or less.

13. The composition of claim 1, wherein the nitrogen-doped carbon aerogel has a density of about 0.3 g/ml or less.

14. The composition of claim 1, wherein the nitrogen-doped carbon aerogel has a specific capacitance of about 50 F/g or more.

15. The composition of claim 1, wherein the nitrogen-doped carbon aerogel has a specific capacitance of about 80 F/g or more.

16. The composition of claim 1, wherein the nitrogen-doped carbon aerogel has an areal capacitance of about 20 $\mu F/cm^2$ or more.

17. The composition of claim 1, wherein the nitrogen-doped carbon aerogel has an areal capacitance of about 25 $\mu F/cm^2$ or more.

18. The composition of claim 1, wherein the nitrogen-doped carbon aerogel is in a form of a monolith having at least one dimension of 100 microns or more.

19. A supercapacitor comprising the composition of claim 1.

* * * * *